US012261917B2

(12) United States Patent
Miller et al.

(10) Patent No.: US 12,261,917 B2
(45) Date of Patent: Mar. 25, 2025

(54) DYNAMIC GEO-BASED COMPUTING HOST IDENTIFICATION FOR AUTOMATIC PROVISIONING

(71) Applicant: Red Hat, Inc., Raleigh, NC (US)

(72) Inventors: Adam Miller, Austin, TX (US); Pierre-Yves Chibon, Puteaux (FR)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 18/448,776

(22) Filed: Aug. 11, 2023

(65) Prior Publication Data

US 2025/0055925 A1    Feb. 13, 2025

(51) Int. Cl.
*H04L 67/00*    (2022.01)
*H04L 67/52*    (2022.01)

(52) U.S. Cl.
CPC .............. *H04L 67/34* (2013.01); *H04L 67/52* (2022.05)

(58) Field of Classification Search
CPC ................................ H04L 67/34; H04L 67/52
See application file for complete search history.

(56) References Cited

U.S. PATENT DOCUMENTS

| 10,846,305 | B2 | 11/2020 | Merriman et al. | |
| 10,977,277 | B2 | 4/2021 | Merriman et al. | |
| 2016/0357782 | A1* | 12/2016 | Jones | H04W 4/021 |
| 2019/0034966 | A1* | 1/2019 | Zaheer | G06Q 30/0261 |
| 2020/0304971 | A1* | 9/2020 | Meijers | H04W 8/245 |

OTHER PUBLICATIONS

Author Unknown, "Segmenting Data by Location," MongoDB, https://www.mongodb.com/docs/manual/tutorial/sharding-segmenting-data-by-location/, accessed online May 2023, 13 pages.
Author Unknown, "Oracle® Database—Using Oracle Sharding," Oracle, https://docs.oracle.com/en/database/oracle/oracle-database/21/shard/using-oracle-sharding.pdf, Mar. 2023, 326 pages.
Author Unknown, "Amazon EC2 Auto Scaling benefits," Amazon EC2 Auto Scaling User Guide, https://docs.aws.amazon.com/autoscaling/ec2/userguide/auto-scaling-benefits.html, accessed online May 26, 2023, 9 pages.
Author Unknown, "twoyao / ansible-mongodb-cluster—A ansible script example deploying minimal mongodb sharding and replication cluster for production environment," GitHub, https://github.com/twoyao/ansible-mongodb-cluster, Oct. 30, 2017, 6 pages.

(Continued)

*Primary Examiner* — Suraj M Joshi
(74) *Attorney, Agent, or Firm* — Dority & Manning, P.A.

(57) ABSTRACT

A computing system receives a first geographic area indication that corresponds to a first geographic area of a plurality of different geographic areas, and provisioning information indicative of a first set of tasks to be performed on each computing host in the first geographic area. The computing system dynamically generates, based on the first geographic area indication, a first computing host list that identifies a first set of computing hosts in the first geographic area. The computing system sends, to a first provisioning node of a plurality of provisioning nodes, instructions to implement the first set of tasks on the first set of computing hosts identified in the first computing host list, the first provisioning node being associated with the first geographic area.

20 Claims, 9 Drawing Sheets

(56) References Cited

OTHER PUBLICATIONS

Graca, João, "GeoSharding: Optimization of data partitioning in sharded georeferenced databases," Universidade de Lisboa, Instituto Superior Tecnico, INESC-ID, https://fenix.tecnico.ulisboa.pt/downloadFile/1407770020544988Extended%20Abstract.pdf, 2016, 10 pages.

Henry, Onyancha Brian, "Deploying & Configuring MongoDB Shards with Ansible," Several9s, https://severalnines.com/blog/deploying-configuring-mongodb-shards-ansible/, Jul. 10, 2019, 10 pages.

Novotny, Jeff, "Database Sharding: Concepts, Examples, and Strategies," Linode Docs, https://www.linode.com/docs/guides/sharded-database/, Mar. 14, 2023, 10 pages.

\* cited by examiner

DYNAMIC GEO-BASED COMPUTING HOST IDENTIFICATION FOR AUTOMATIC PROVISIONING

BACKGROUND

Computing hosts are typically repeatedly provisioned with software over time. The provisioning may involve installing new software, new releases, removing software, changing configurations, or the like.

SUMMARY

The examples disclosed herein implement dynamic geo-based computing host identification for automatic provisioning.

In one example a method is provided. The method includes receiving, by a computing system, a first geographic area indication that corresponds to a first geographic area of a plurality of different geographic areas, and provisioning information indicative of a first set of tasks to be performed on each computing host in the first geographic area. The method further includes dynamically generating, by the computing system based on the first geographic area indication, a first computing host list that identifies a first set of computing hosts in the first geographic area. The method further includes sending, by the computing system to a first provisioning node of a plurality of provisioning nodes, instructions to implement the first set of tasks on the first set of computing hosts identified in the first computing host list, the first provisioning node being associated with the first geographic area.

In another example a computing system is provided. The computing system includes one or more computing devices to receive a first geographic area indication that corresponds to a first geographic area of a plurality of different geographic areas, and provisioning information indicative of a first set of tasks to be performed on each computing host in the first geographic area. The one or more computing devices are further to dynamically generate, based on the first geographic area indication, a first computing host list that identifies a first set of computing hosts in the first geographic area. The one or more computing devices are further to send, to a first provisioning node of a plurality of provisioning nodes, instructions to implement the first set of tasks on the first set of computing hosts identified in the first computing host list, the first provisioning node being associated with the first geographic area.

In another example a non-transitory computer-readable storage medium is provided. The non-transitory computer-readable storage medium includes executable instructions to cause one or more computing devices to receive a first geographic area indication that corresponds to a first geographic area of a plurality of different geographic areas, and provisioning information indicative of a first set of tasks to be performed on each computing host in the first geographic area. The executable instructions further cause the one or more computing devices to dynamically generate, based on the first geographic area indication, a first computing host list that identifies a first set of computing hosts in the first geographic area. The executable instructions further cause the one or more computing devices to send, to a first provisioning node of a plurality of provisioning nodes, instructions to implement the first set of tasks on the first set of computing hosts identified in the first computing host list, the first provisioning node being associated with the first geographic area.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
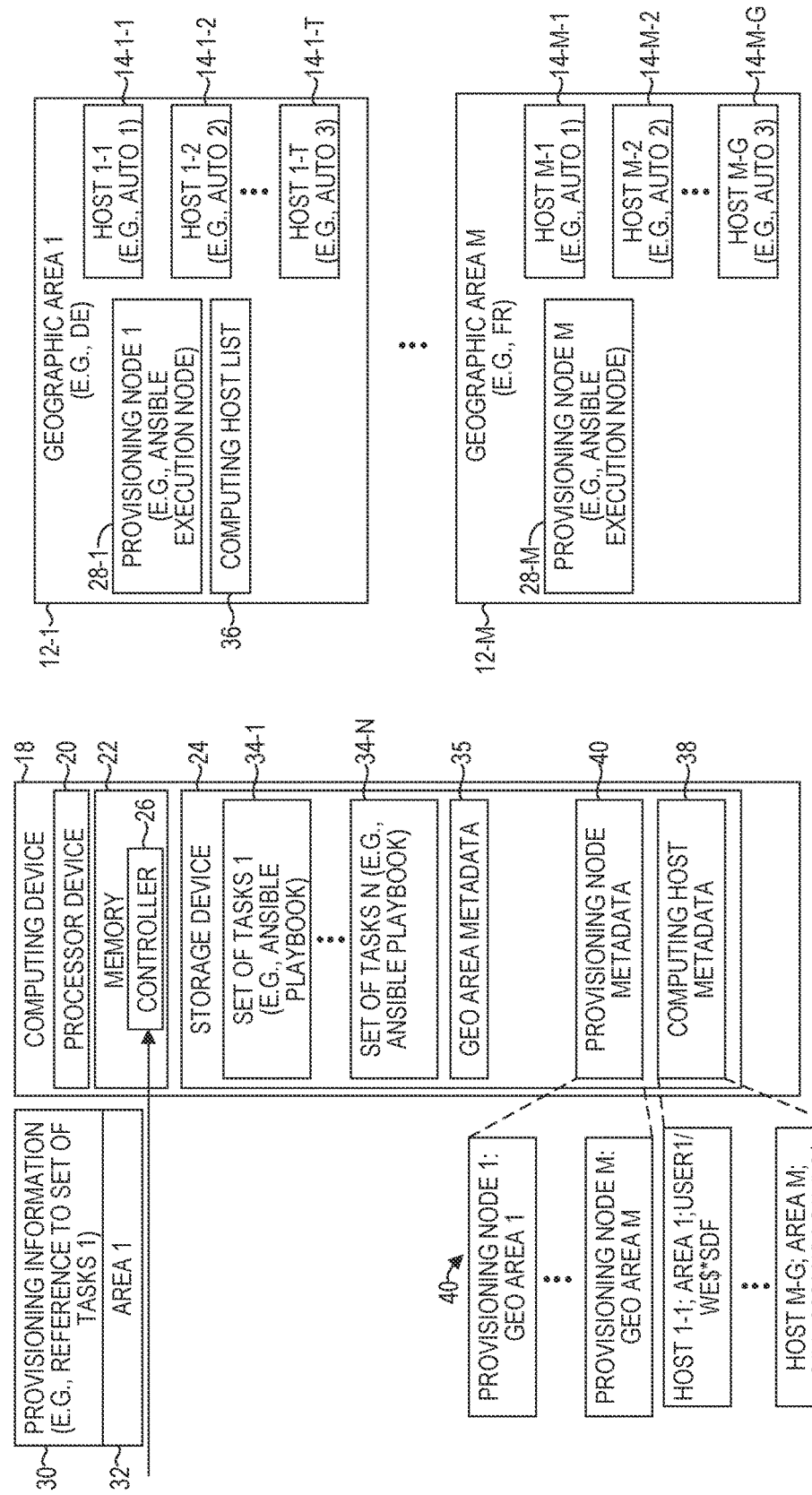
FIG. 1 is a block diagram of an environment in which dynamic geo-based computing host identification for automatic provisioning can be practiced according to one implementation.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Computing hosts are typically repeatedly provisioned with software over time. The provisioning may involve installing new software, new releases, removing software, changing configurations, or the like. An entity, such as a business, government, service provider, or the like, may need to maintain hundreds, thousands or millions of computing hosts and ensure such computing hosts are repeatedly provisioned correctly. As an example, an automobile manufacturer may need to release over-the-air updates from time to time to fix problems or implement new features in automobiles manufactured by the automobile manufacturer. As another example, an international cloud computing provider may have tens of thousands of computing hosts distributed in hundreds of countries that need to have a bug patch provisioned on the computing hosts to eliminate a potential security threat.

Provisioning platforms, such as Red Hat® Ansible® Automation Platform, have been developed to bring consistency and structure to the computing host provisioning process. Given a set of tasks, an automation platform may ensure that the tasks are performed on hundreds, thousands or millions of computing hosts to provision the computing hosts in a same, consistent manner, eliminating substantial human effort and human error. The tasks may be in the form of instructions, operations and/or commands that comply with a particular syntax.

For scalability purposes, an automation platform may desire to locate a plurality of provisioning nodes that carry out the provisioning identified in the set of tasks in different geographic areas such that computing hosts are not provisioned over long distances, such as thousands of miles, which may introduce substantial provisioning delays and problems that might not otherwise occur if the provisioning nodes and the computing host being provisioned were physically closer to one another.

In order to provision computing hosts in a particular area, the operator must determine which provisioning node is closest to the computing hosts, and then generate a list of computing hosts for the provisioning node to provision. The list of computing hosts may identify thousands of computing hosts, may change daily, and the likelihood of a human constantly updating such a list without error is remote, resulting in computing hosts not being properly provisioned.

Moreover, given a list of computing hosts that have some common criteria that requires such computing hosts to be provisioned, but which are in different geographic areas, it can be difficult to determine which provisioning node should be instructed to provision each such computing host.

The examples disclosed herein implement dynamic geo-based computing host identification for automatic provisioning. The examples determine, based on a geographic area indication, those computing hosts located in the geographic area, and generate a computing host list that identifies each such computing host. The examples may also determine the particular provisioning node of the plurality of provisioning nodes in different geographic areas to which the set of tasks should be sent.

In another implementation, the examples disclosed herein determine for each respective computing host of a plurality of computing hosts a provisioning node that is an appropriate provisioning node for the respective computing host, and generate for each such provisioning node a computing host list identifying those computing hosts that the provisioning node is to provision.

FIG. 1 is a block diagram of an environment 10 in which dynamic geo-based computing host identification for automatic provisioning can be practiced according to one implementation. The environment 10 includes a plurality of geographic areas 12-1-12-M (generally, geographic areas 12). The geographic area 12-1 includes a plurality of computing hosts 14-1-1-14-1-T (generally, computing hosts 14-1), and the geographic area 12-M includes a plurality of computing hosts 14-M-1-14-M-G (generally, computing hosts 14-M). The computing hosts 14-1 and 14-M may be referred generally as the computing hosts 14, or as a computing host 14. The computing hosts 14 may be relatively immobile, such as server computing devices, relatively mobile, such as computing devices that control automobiles, or any combination thereof. If mobile, the computing hosts 14 may be located in one geographic area 12 at one point in time and be located in another geographic area 12 at another point in time. The geographic areas 12 may be defined by any desired criterion or criteria, such as by zip code, country, state, county, coordinates including a location and an area size, or the like.

The environment 10 includes a computing system 16 that includes one or more computing devices 18. The computing device 18 includes a processor device 20, a memory 22, and is communicatively coupled to a storage device 24. The memory 22 includes a controller 26 to which certain functionality described herein will be attributed. It is noted, however, that the controller 26 may in practice comprise multiple separate applications that execute on one or more of the computing devices 18 and communicate among one another to implement the described functionality. Moreover, because the controller 26 is a component of the computing system 16, functionality implemented by the controller 26 may be attributed to the computing system 16 generally, or to one or more of the computing devices 18 generally. Moreover, in examples where the controller 26 comprises software instructions that program the processor device 20 to carry out functionality discussed herein, functionality implemented by the controller 26 may be attributed herein to one or more processor devices 20 of one or more computing devices 18 of the computing system 16.

The geographic area 12-1 includes one or more provisioning nodes 28-1 that are responsible for provisioning the computing hosts 14-1 in the geographic area 12-1. For purposes of illustration and discussion it will be assumed that a particular provisioning node 28-1 services the entire geographic area 12-1, however, in other implementations, multiple provisioning nodes 28-1 may service either the same geographic area 12-1, or the geographic area 12-1 may be further subdivided into sub-geographic areas within the geographic area 12-1, and different provisioning nodes 28-1 may service different sub-geographic areas. The geographic area 12-M similarly includes one or more provisioning nodes 28-M that are responsible for provisioning the computing hosts 14-M in the geographic area 12-M. The provisioning nodes 28-1 and 28-M may be referred to herein generally as a provisioning node 28 or the provisioning nodes 28.

The terms "provision" or "provisioning" in this context refers to making modifications to the computing hosts 14, such as installing software on the computing hosts 14, removing software from the computing hosts 14, changing software on the computing hosts 14, or the like. Such modifications typically involve making changes to data that is stored on non-transitory storage devices of the computing hosts 14. In some implementations, the provisioning node 28-1 may comprise an execution node implemented in the Ansible® Automation Platform, however, the examples disclosed herein are not limited to any particular automation platform. In some implementations, the provisioning node 28-1 may operate by logging onto each computing host 14-1 via, for example, SSH, and executing the appropriate commands on the computing host 14-1 to cause the computing host 14-1 to be provisioned in the desired manner.

In this example, the controller 26 receives provisioning information 30 indicative of a set of tasks to be performed on each computing host 14 in a particular geographic area 12, and a geographic area indication 32 that corresponds to the geographic area 12-1. The geographic area indication 32 may comprise any suitable information that can be used to correspond to a particular geographic area, such as a predetermined identifier known to the controller 26 to correspond to the geographic area 12-1, or a known geographic identifier from which the geographic area 12-1 can be determined, such as a zip code, a state identifier, a country identifier, or the like.

The provisioning information 30 may comprise the actual set of tasks to be performed on the computing hosts 14, or a reference to the set of tasks, such as a uniform resource identifier (URI) to a file that contains the set of tasks. In this example, the provisioning information 30 comprises a reference to a set of tasks 34-1 which is one of a plurality of different sets of instructions 34-1-34-P (generally, sets of instructions 34). In an Ansible® Automation Platform implementation, the sets of task 34 may be identified in a playbook, but generally, the sets of tasks 34 identify instructions, operations and/or commands that are to be performed to cause the computing hosts 14 to be provisioned in a desired manner.

The controller 26 accesses geographic area metadata 35 that correlates the geographic area indication 32 to the geographic area 12-1, and generates a computing host list 36. Generally, the controller 26 determines a location of each computing host 14 that is in the geographic area 12-1. In one implementation, when a computing host 14 is added to the environment 10, computing host metadata 38 is generated that identifies for the computing host 14 the particular geographic area in which the computing host 14 is located. The computing host metadata 38 may also include, for example, credentials such as a user identifier and a password that allows a provisioning node 28 to SSH to the respective computing host 14. In such implementation, the controller 26 may access the computing host metadata 38 and add to the computing host list 36 each computing host 14 that is indicated in the computing host metadata 38 as being associated with the geographic area 12-1.

In another implementation, the controller 26 accesses information that identifies each computing host 14, such as, by way of non-limiting example, the computing host metadata 38. The controller 26 determines the IP address associated with each computing host 14, and based on the IP address, determines the geographic location associated with the IP address. The controller 26 may, for example, utilize a geolocation service that provides the geographic location of an IP address. The controller 26 adds to the computing host list 36 a computing host identifier for each computing host 14 that has a corresponding IP address that is associated with the geographic area 12-1.

In yet another implementation, the controller 26 accesses information that identifies each computing host 14, such as the computing host metadata 38 and sends a message to each computing host 14 requesting a geographic location of the computing host 14. The controller 26 adds to the computing host list 36 a computing host identifier for each computing host 14 of the plurality of computing hosts 14-1-1-14-M-G that replies with a geographic location that is in the geographic area 12-1.

The controller 26 may be provided, in conjunction with the provisioning information 30 and the geographic area indication 32, a provisioning node identifier that identifies the provisioning node 28 that will provision the computing hosts 14. In other implementations, the controller 26 may automatically determine the appropriate provisioning node 28 based on the geographic area indication 32. In such implementation, the controller 26 may access provisioning node metadata 40 that identifies the plurality of provisioning nodes 28, and for each provisioning node 28 of the plurality of provisioning nodes 28, a corresponding geographic area. Based on the geographic area indication 32 and the provisioning node metadata 40, the controller 26 determines that the provisioning node 28-1 provisions computing hosts 14 located in the geographic area 12-1.

The controller 26 may generate the computing host list 36 in a particular predetermined location such that the provisioning node 28-1 will know where to obtain the computing host list 36, or may send the computing host list 36 or a reference to the computing host list 36 to the provisioning node 28-1. The controller 26 sends instructions to the provisioning node 28-1 to implement the set of tasks 34-1 on the first set of computing hosts 14 identified in the computing host list 36.

The provisioning node 28-1 receives the instructions to implement the set of tasks 34-1 on the set of computing hosts 14 identified in the computing host list 36, and implements the set of tasks 34-1 on the set of computing hosts 14. In one implementation, the provisioning node 28-1 logs onto each respective computing host 14 via, for example, SSH using the corresponding credentials for the respective computing host 14, and implements each task in the set of tasks 34-1 on the respective computing host 14.

Figure 2:
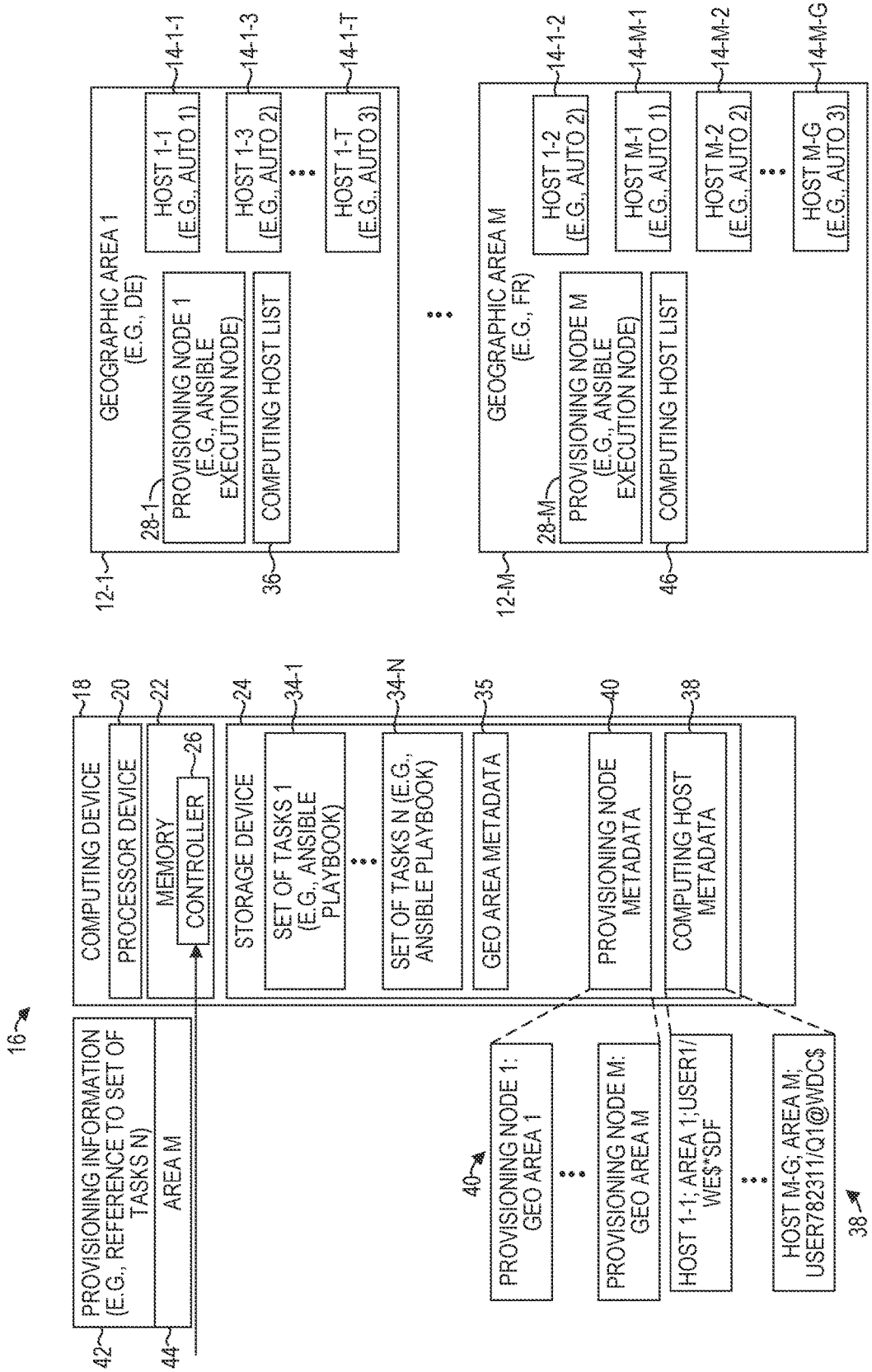
FIG. 2 is a block diagram of the environment illustrated in FIG. 1 at a subsequent point in time according to one implementation.

FIG. 2 is a block diagram of the environment 10 illustrated in FIG. 1 at a subsequent point in time according to one implementation. The computing host 14-1-2 has moved to the geographic area 12-M, and thus the computing hosts 14-1-1, 14-1-3-14-1-T are now located in the geographic area 12-1, and the computing hosts 14-1-2, 14-M-1-14-M-G are now located in the geographic area 12-M.

The controller 26 receives provisioning information 42 indicative of a set of tasks to be performed on each computing host 14 in a particular geographic area 12, and a geographic area indication 44 that corresponds to the geographic area 12-M. In this example, the provisioning information 42 comprises a reference to a set of tasks 34-N.

The controller 26 accesses the geographic area metadata 35 that correlates the geographic area indication 44 to the geographic area 12-M, and generates a computing host list 46. Again, the controller 26 determines a location of each computing host 14 that is in the geographic area 12-M. In this example, the computing host list 46 identifies the computing hosts 14-1-2, 14-M-1-14-M-G. The controller 26 accesses the provisioning node metadata 40 and determines that the provisioning node 28-M is operable to provision computing hosts 14 located in the geographic area 12-M.

The controller 26 generates the computing host list 46 in a predetermined location such that the provisioning node 28-M will know where to obtain the computing host list 46. The controller 26 sends instructions to the provisioning node 28-M to implement the set of tasks 34-N on the set of computing hosts 14 identified in the computing host list 46.

The provisioning node 28-M receives the instructions to implement the set of tasks 34-N on the set of computing hosts 14 identified in the computing host list 46, and implements the set of tasks 34-N on the set of computing hosts 14. In one implementation, the provisioning node 28-M logs onto each respective computing host 14 via, for example, SSH using the corresponding credentials for the respective computing host 14, and implements each task in the set of tasks 34-N on the respective computing host 14.

Figure 3:
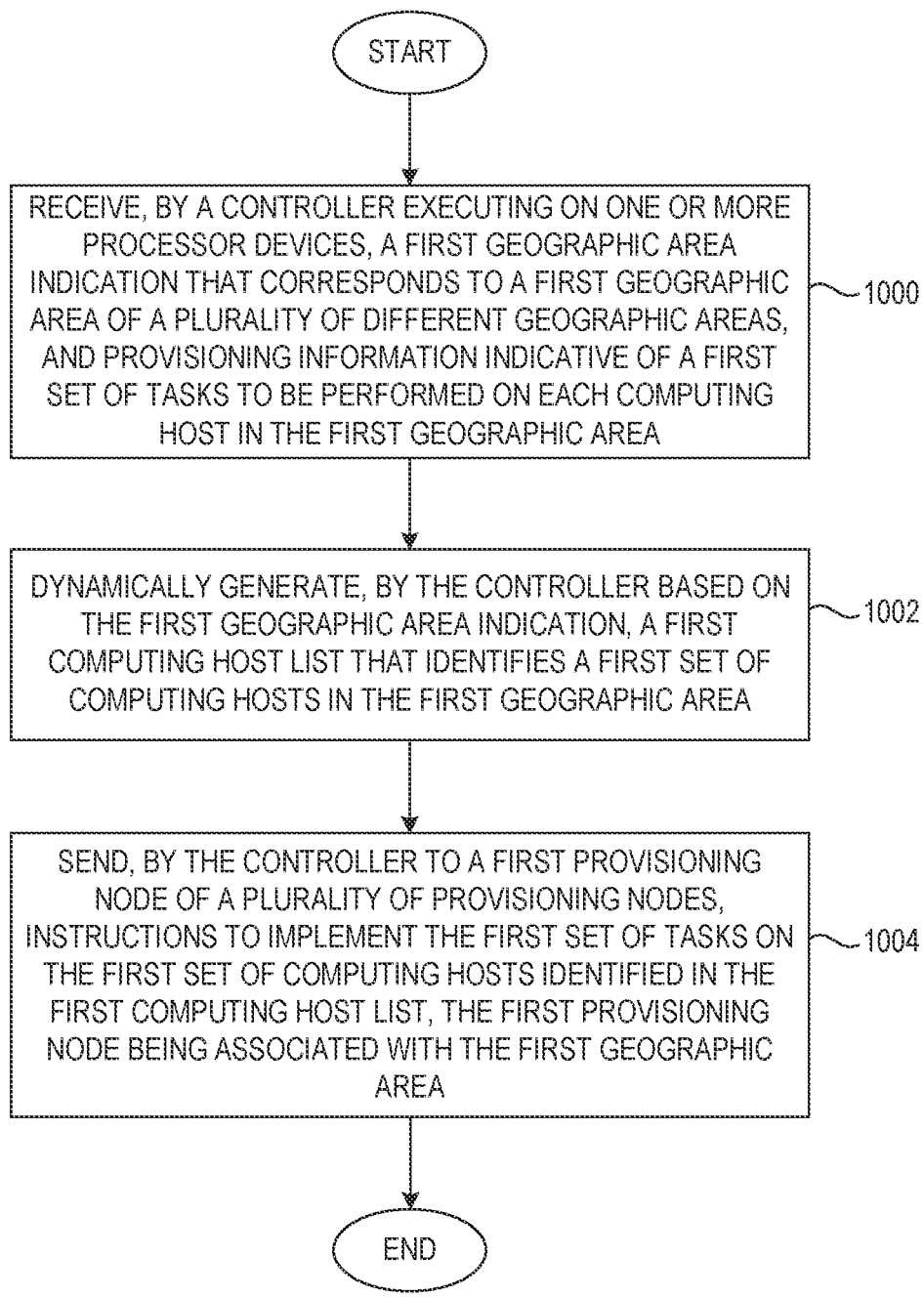
FIG. 3 is a flowchart of a method for dynamic geo-based computing host identification for automatic provisioning according to one implementation.

FIG. 3 is a flowchart of a method for dynamic geo-based computing host identification for automatic provisioning according to one implementation. FIG. 3 will be discussed in conjunction with FIG. 2. The controller 26

The controller 26 receives the geographic area indication 32 that corresponds to the geographic area 12-1 of the plurality of different geographic areas 12-1-12-M, and the provisioning information 30 indicative of the set of tasks 34-1 to be performed on each computing host 14 in the geographic area 12-1 (FIG. 3, block 1000). The controller 26 dynamically generates, based on the geographic area indication 32, the computing host list 36 that identifies the set of computing hosts 14-1-1-14-1-T in the geographic area 12-1 (FIG. 3, block 1002). The controller 26 sends to the provisioning node 28-1 of the plurality of provisioning nodes 28-1-28-M, instructions to implement the set of tasks 34-1 on the set of computing hosts 14-1-1-14-1-T identified in the computing host list 36, the provisioning node 28-1 being associated with the geographic area 12-1 (FIG. 3, block 1004).

Figure 4:
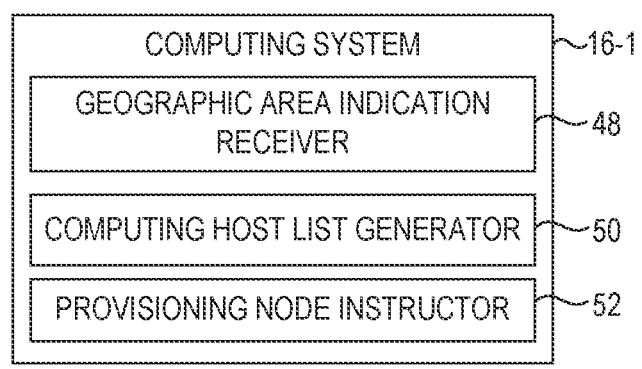
FIG. 4 is a block diagram of a computing system suitable for implementing aspects illustrated in FIGS. 1-3 according to one implementation.

FIG. 4 is a block diagram of a computing system 16-1 suitable for implementing aspects illustrated in FIGS. 1-3 according to one implementation. The computing system 16-1 implements identical functionality as that described above with regard to the computing system 16. The computing system 16-1 includes a geographic area indication receiver 48 to receive a geographic area indication that corresponds to a geographic area of a plurality of different geographic areas, and provisioning information indicative of a set of tasks to be performed on each computing host in the geographic area. The geographic area indication receiver 48 may comprise executable software instructions configured to program a processor device to implement the functionality of receiving a geographic area indication that corresponds to a geographic area of a plurality of different geographic areas, and provisioning information indicative of a set of tasks to be performed on each computing host in the geographic area, may comprise circuitry including, by way of non-limiting example, an application-specific integrated circuit (ASIC), field-programmable gate array (FPGA), or may comprise a combination of executable software instructions and circuitry. In some implementations, the geographic area indication receiver 48 may receive the geographic area indication and the provisioning information via user input entered into a user interface. In some implementations, the geographic area indication receiver 48 may receive the geographic area indication and the provisioning information via inter-process communication with an application executing on the computing system 16-1 or executing on another computing system. In some implementations, the geographic area indication receiver 48 may receive the geographic area indication and the provisioning information by accessing a predetermined memory location, or by accessing a file that identifies the geographic area indication and the provisioning information.

The computing system 16-1 also includes a computing host list generator 50 to dynamically generate, based on the geographic area indication, a computing host list that identifies a set of computing hosts in the geographic area. The computing host list generator 50 may comprise executable software instructions configured to program a processor device to implement the functionality of dynamically generating, based on the geographic area indication, a computing host list that identifies a set of computing hosts in the geographic area, may comprise circuitry including, by way of non-limiting example, an ASIC, FPGA, or may comprise a combination of executable software instructions and circuitry. In some implementations the computing host list generator 50 may generate the computing host list based on metadata associated with each computing host that identifies a geographic area of the computing host. In some implementations the computing host list generator 50 may generate the computing host list by determining an IP address of each computing host and using an IP address geolocation service that provides the geographic location of an IP address. In some implementations the computing host list generator 50 may generate the computing host list by requesting, from each computing host, a current location of the computing host. In some implementations the computing host list generator 50 may generate the computing host list in a predetermined location known to the provisioning node.

The computing system 16-1 also includes a provisioning node instructor 52 to send, to a provisioning node of a plurality of provisioning nodes, instructions to implement the set of tasks on the set of computing hosts identified in the computing host list, the provisioning node being associated with the geographic area. The provisioning node instructor 52 may comprise executable software instructions to program a processor device to implement the functionality of sending, to a provisioning node of a plurality of provisioning nodes, instructions to implement the set of tasks on the set of computing hosts identified in the computing host list, the provisioning node being associated with the geographic area, may comprise circuitry including, by way of non-limiting example, an ASIC, FPGA, or may comprise a combination of executable software instructions and circuitry. In some implementations the provisioning node instructor 52 may simply send a message to the provisioning node. In some implementations, the message may include the set of tasks. In some implementations, the message may also include the computing host list.

Figure 5:
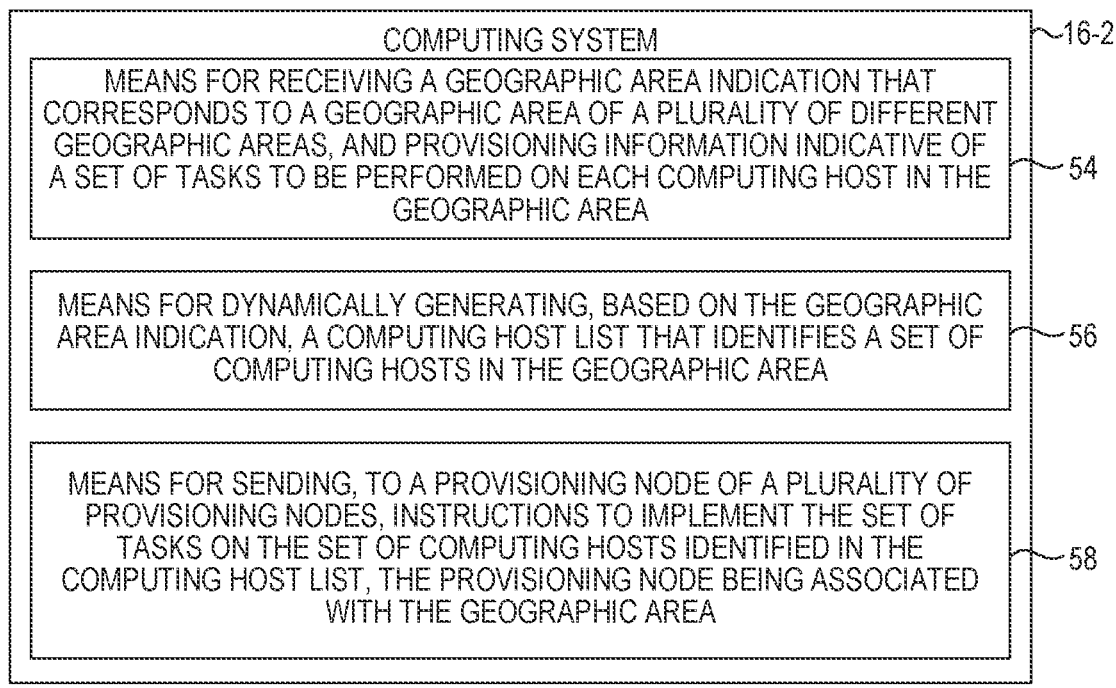
FIG. 5 is a block diagram of a computing system suitable for implementing aspects illustrated in FIGS. 1-3 according to another implementation.

FIG. 5 is a block diagram of a computing system 16-2 suitable for implementing aspects illustrated in FIGS. 1-3 according to another implementation. The computing system 16-2 implements identical functionality as that described above with regard to the computing device 18. In this implementation, the computing system 16-2 includes a means 54 for receiving a geographic area indication that corresponds to a geographic area of a plurality of different geographic areas, and provisioning information indicative of a set of tasks to be performed on each computing host in the geographic area. The means 54 may be implemented in any number of manners, including, for example, via the geographic area indication receiver 48 illustrated in FIG. 4.

The computing device 12-2 also includes a means 56 for dynamically generating, based on the geographic area indication, a computing host list that identifies a set of computing hosts in the geographic area. The means 56 may be implemented in any number of manners, including, for example, via the computing host list generator 50 illustrated in FIG. 4.

The computing device 12-2 also includes a means 58 for sending, to a provisioning node of a plurality of provisioning nodes, instructions to implement the set of tasks on the set of computing hosts identified in the computing host list, the provisioning node being associated with the geographic area. The means 58 may be implemented in any number of manners, including, for example, via the provisioning node instructor 52 illustrated in FIG. 4.

Figure 6:
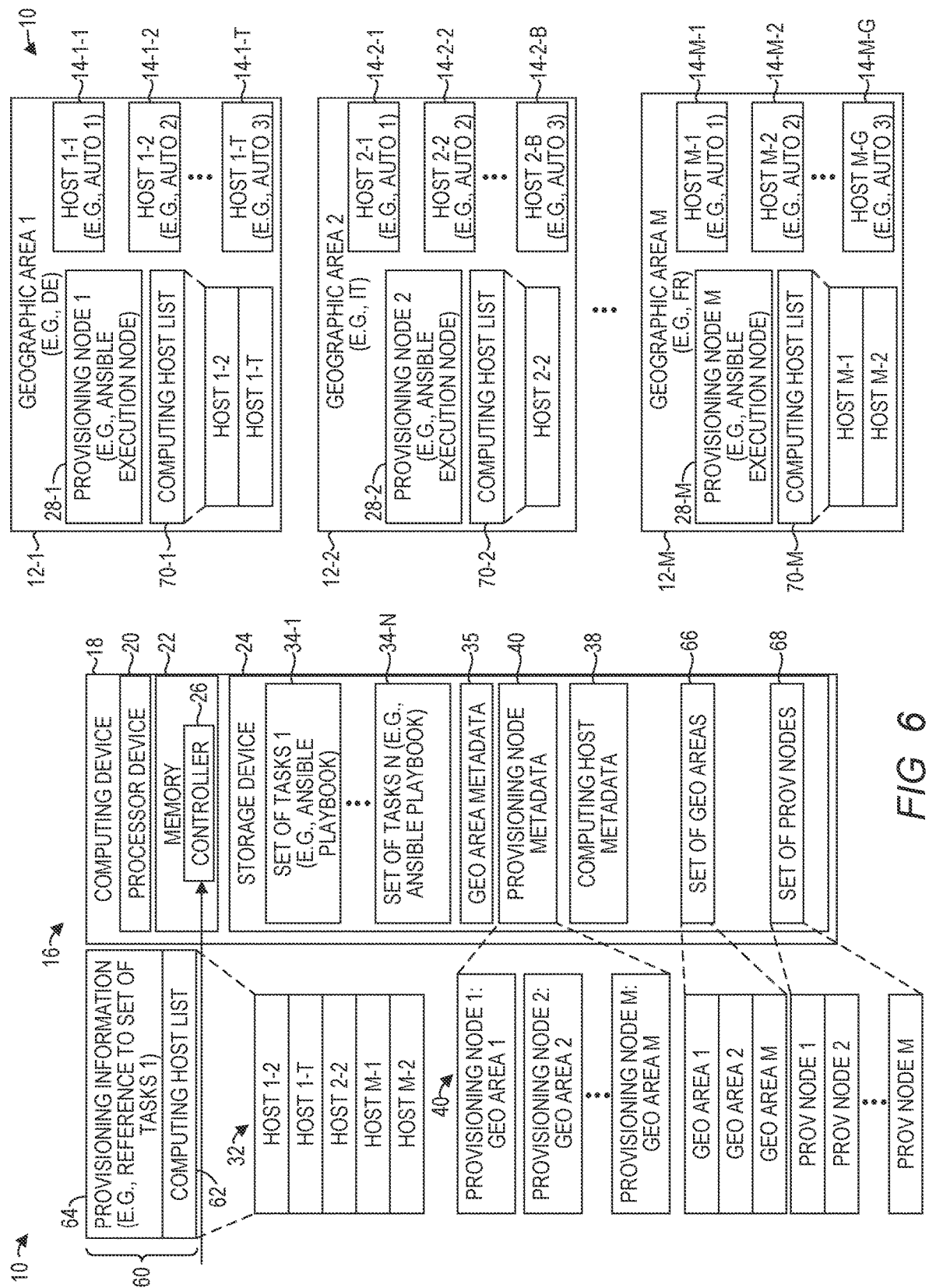
FIG. 6 is a block diagram of an environment in which dynamic geo-based computing host identification for automatic provisioning can be practiced according to another implementation.

FIG. 6 is a block diagram of the environment 10 in which dynamic geo-based computing host identification for automatic provisioning can be practiced according to another implementation. In this example, the environment 10 includes a geographic area 12-2 that includes one or more provisioning nodes 28-2 that are responsible for provisioning computing hosts 14-2-1-14-2-B (generally, computing hosts 14-2) in the geographic area 12-2. In this example, the controller 26 may access information 60 that includes a computing host list 62 that identifies a set of computing hosts 14 and provisioning information 64 indicative of a set of tasks 34-1 to be performed on each computing host 14 in the computing host list 62 of computing hosts 14. The computing host list 62 identifies the computing hosts 14-1-2, 14-1-T, 14-2-2, 14-M-1, and 14-M-2 (hosts 1-2, 1-T, 2-2, M-1 and M-2, respectively).

The controller 26 determines a set 66 of geographic areas 12 that comprises each geographic area 12 of the plurality of geographic areas 12-1-12-M with which at least one computing host 14 in the set of computing hosts 14 identified in the computing host list 62 is associated. In one implementation, the controller 26 accesses the geographic area metadata 35 that correlates each computing host 14 to a particular geographic area to determine the set 66 of geographic areas 12. In another implementation, the controller 26 accesses information that identifies each computing host 14, such as, by way of non-limiting example, the computing host metadata 38. The controller 26 determines the IP address associated with each computing host 14, and based on the IP address, determines the geographic location associated with the IP address. The controller 26 may, for example, utilize a geolocation service that provides the geographic location of an IP address. The controller 26 adds to the set 66 of geographic areas 12 each geographic area 12 in which a computing host 14 is located. In yet another implementation, the controller 26 accesses information that identifies each computing host 14, such as the computing host metadata 38 and sends a message to each computing host 14 requesting a geographic location of the computing host 14. Based on the replies, the controller 26 adds to the set 66 of geographic areas 12 each geographic area 12 in which a computing host 14 is located.

The controller 26, based on the set 66 of geographic areas 12, determines a set 68 of provisioning nodes 28 from the plurality of provisioning nodes 28-1-28-M associated with the geographic areas 12 identified in the set 66 of geographic areas 12. In one implementation, the controller 26 may access the provisioning node metadata 40 that identifies the plurality of provisioning nodes 28, and for each provisioning node 28 of the plurality of provisioning nodes 28, a corresponding geographic area 12. Based on the geographic areas 12 identified in the set 66 of geographic areas 12, the controller 26 generates the set 68 of provisioning nodes 28.

The controller 26 then generates a plurality of second computing host lists 70-1, 70-2 and 70-M, each second computing host list 70-1, 70-2 and 70-M corresponding to a different respective geographic area 12-1, 12-2, and 12-M, and identifying the group of computing hosts 14 identified in the computing host list 62 and associated with the respective geographic area 12-1, 12-2, and 12-M. The controller 26 sends the second computing host lists 70-1, 70-2 and 70-M to the provisioning nodes 28-1, 28-2 and 28-M, respectively. In one implementation, the controller 26 stores each respective second computing host list 70-1, 70-2 and 70-M in a different predetermined location associated with the provisioning node 28 that corresponds to the respective second computing host list 70-1, 70-2 and 70-M.

Each provisioning node 28-1, 28-2 and 28-M receives the instructions to implement the set of tasks 34-1 on the group of computing hosts 14 identified in the corresponding second computing host list 70-1, 70-2 and 70-M, and implements on the group of computing hosts 14 identified in the respective second computing host lists 70-1, 70-2 and 70-M, the set of tasks 34-1.

Figure 7:
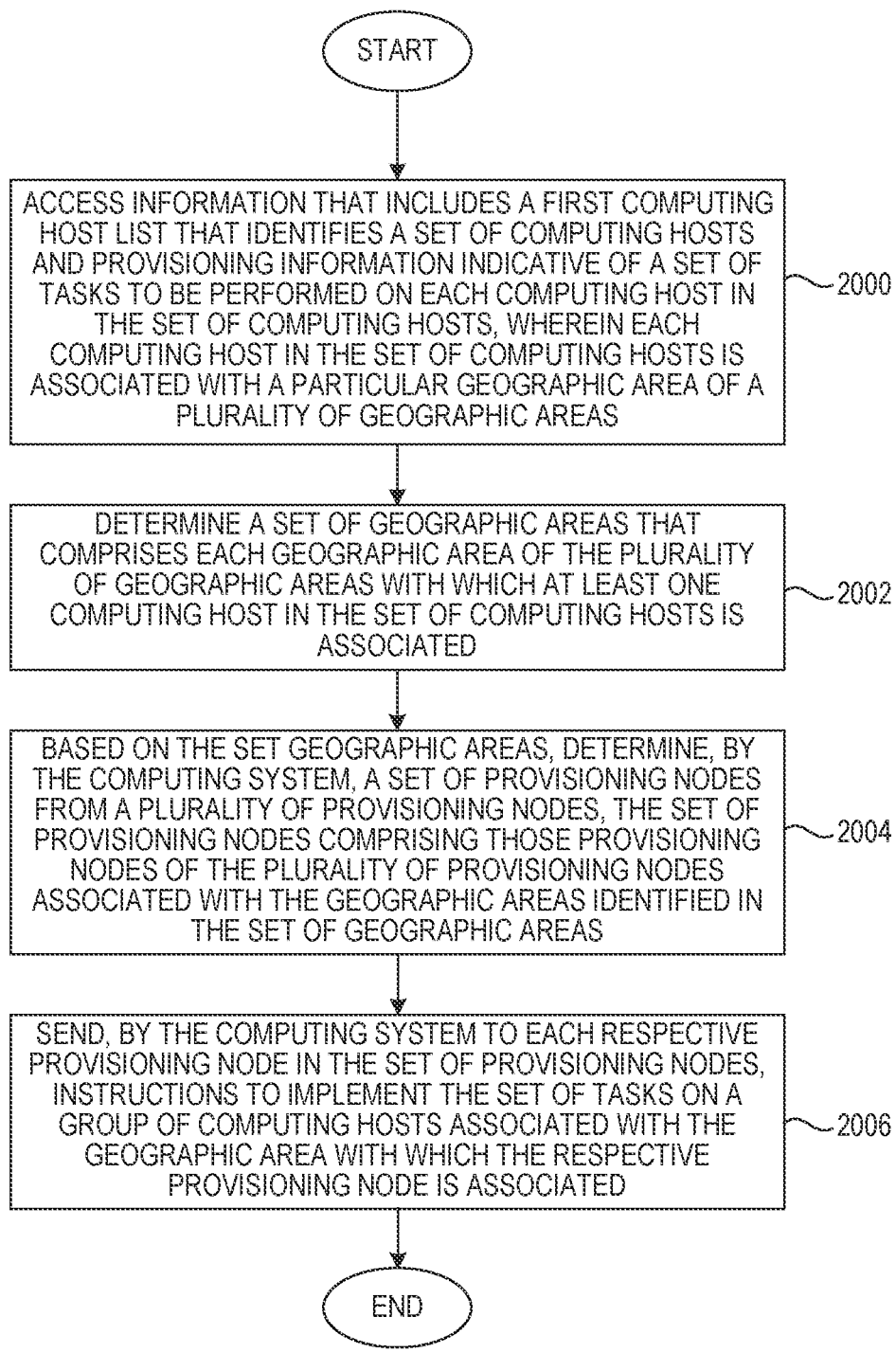
FIG. 7 is a flow chart of a method for dynamic geo-based computing host identification for automatic provisioning according to another implementation.

FIG. 7 is a flow chart of a method for dynamic geo-based computing host identification for automatic provisioning according to another implementation. FIG. 7 will be discussed in conjunction with FIG. 6. The computing system 16 accesses the information 60 that includes the computing host list 62 that identifies the set of computing hosts 14 and the provisioning information 64 indicative of the set of tasks 34-1 to be performed on each computing host 14 in the set of computing hosts 14, wherein each computing host 14 in the set of computing hosts 14 is associated with a particular geographic area 12 of the plurality of geographic areas 12-1-12-M (FIG. 7, block 2000). The computing system 16 determines the set 66 of geographic areas 12 that comprises each geographic area 12 of the plurality of geographic areas 12-1-12-M with which at least one computing host 14 in the set of computing hosts 14 is associated (FIG. 7, block 2002). The computing system 16, based on the set 66 of geographic areas 12, determines the set 68 of provisioning nodes 28 from the plurality of provisioning nodes 28-1-28-M comprising those provisioning nodes 28 of the plurality of provisioning nodes 28-1-28-M associated with the geographic areas 12 identified in the set 66 of geographic areas 12 (FIG. 7, block 2004). The computing system 16 sends, to each respective provisioning node 28 in the set 68 of provisioning nodes, instructions to implement the set of tasks 34-1 on the group of computing hosts 14 associated with the geographic area 12 with which the respective provisioning node 28 is associated (FIG. 7, block 2006).

Figure 8:
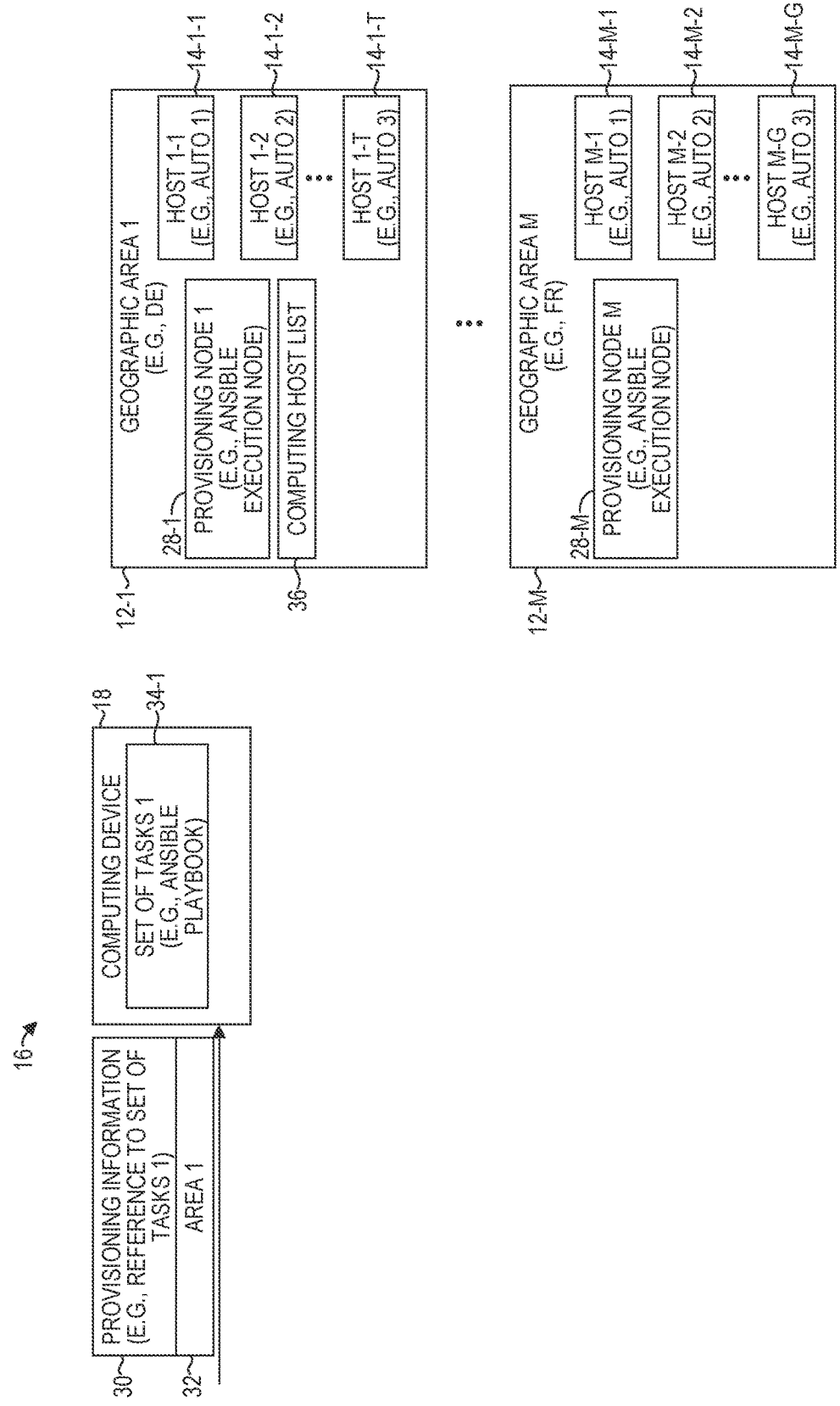
FIG. 8 is a simplified block diagram of the environment illustrated in FIG. 1 according to one implementation.

FIG. 8 is a simplified block diagram of the environment 10 illustrated in FIG. 1 according to one implementation. The computing system 16 includes the one or more computing devices 18 to receive the geographic area indication 32 that corresponds to the geographic area 12-1 of the plurality of different geographic areas 12-1-12-M, and the provisioning information 30 indicative of the set of tasks 34-1 to be performed on each computing host 14 in the geographic area 12-1. The one or more computing devices 18 are further to dynamically generate, based on the geographic area indication 32, the computing host list 36 that identifies the set of computing hosts 14 in the geographic area 12-1. The one or more computing devices 18 are further to dynamically send, to the provisioning node 28-1 of the plurality of provisioning nodes 28-1-28-M, instructions to implement the set of tasks 34-1 on the set of computing hosts 14 identified in the computing host list 36, the provisioning node 28-1 being associated with the geographic area 12-1.

Figure 9:
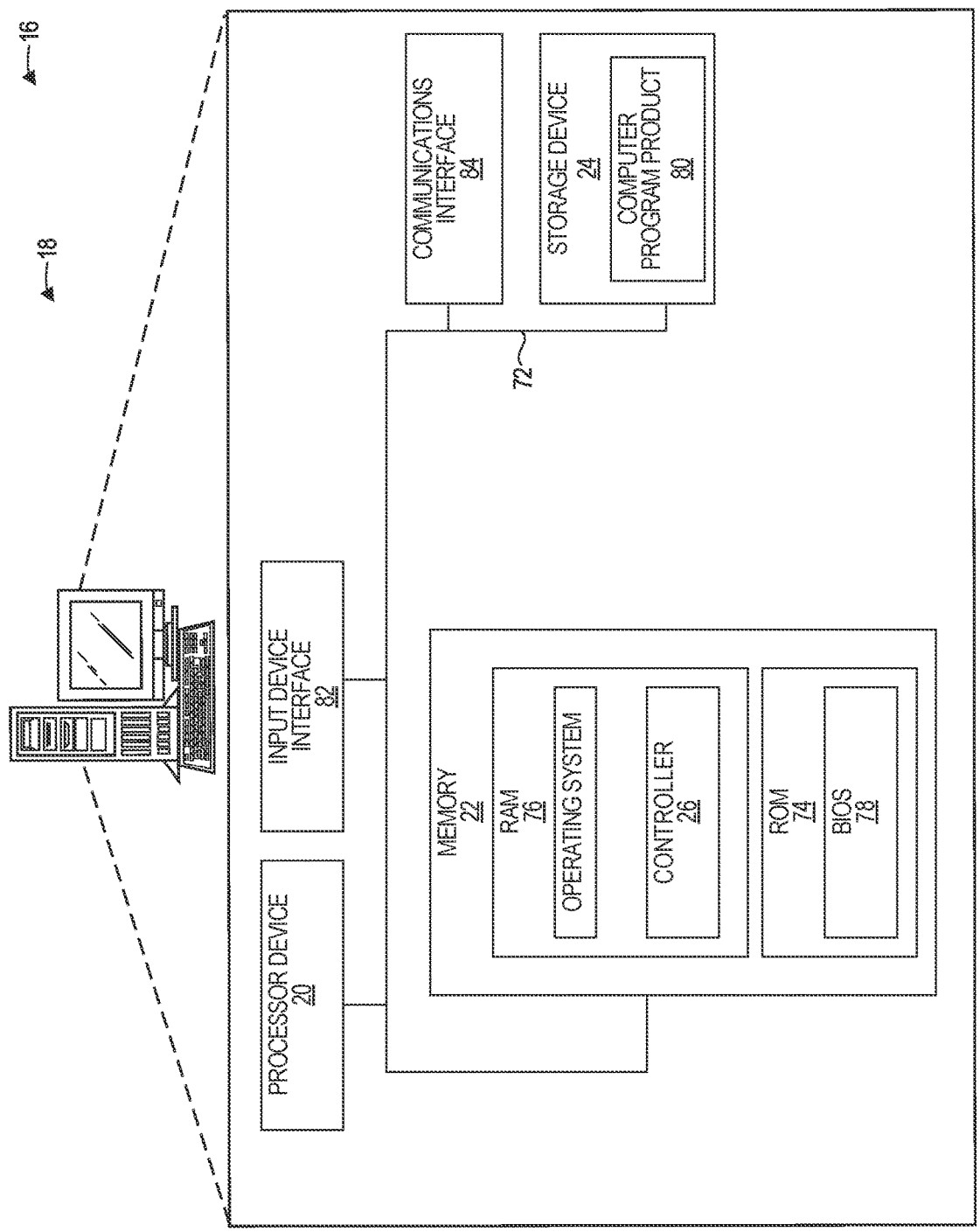
FIG. 9 is a block diagram of the computing system 16 suitable for implementing examples according to one example.

FIG. 9 is a block diagram of the computing system 16 suitable for implementing examples according to one example. The computing system 16 may comprise any computing or electronic device capable of including firmware, hardware, and/or executing software instructions to implement the functionality described herein, such as a computer server, a desktop computing device, or the like. The computing system 16 includes the processor device 20, the system memory 22, and a system bus 72. The system bus 72 provides an interface for system components including, but not limited to, the system memory 22 and the processor device 20. The processor device 20 can be any commercially available or proprietary processor.

The system bus 72 may be any of several types of bus structures that may further interconnect to a memory bus (with or without a memory controller), a peripheral bus, and/or a local bus using any of a variety of commercially available bus architectures. The system memory 22 may include non-volatile memory 74 (e.g., read-only memory (ROM), erasable programmable read-only memory (EPROM), electrically erasable programmable read-only memory (EEPROM), etc.), and volatile memory 76 (e.g., random-access memory (RAM)). A basic input/output system (BIOS) 78 may be stored in the non-volatile memory 74 and can include the basic routines that help to transfer information between elements within the computing system 16. The volatile memory 76 may also include a high-speed RAM, such as static RAM, for caching data.

The computing system 16 may further include or be coupled to a non-transitory computer-readable storage medium such as the storage device 24, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 24 and other drives associated with computer-readable media and computer-usable media may provide non-volatile storage of data, data structures, computer-executable instructions, and the like.

A number of modules can be stored in the storage device 24 and in the volatile memory 76, including an operating system and one or more program modules, such as the controller 26, which may implement the functionality described herein in whole or in part. All or a portion of the examples may be implemented as a computer program product 80 stored on a transitory or non-transitory computer-usable or computer-readable storage medium, such as the storage device 24, which includes complex programming instructions, such as complex computer-readable program code, to cause the processor device 20 to carry out the steps described herein. Thus, the computer-readable program code can comprise software instructions for implementing the functionality of the examples described herein when executed on the processor device 20. The processor device 20, in conjunction with the controller 26 in the volatile memory 76, may serve as a controller, or control system, for the computing system 16 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 20 through an input device interface 82 that is coupled to the system bus 72 but can be connected by other interfaces such as a parallel port, an Institute of Electrical and Electronic Engineers (IEEE) 1394 serial port, a Universal Serial Bus (USB) port, an IR interface, and the like. The computing system 16 may also include the communications interface 84 suitable for communicating with a network as appropriate or desired.

Example 1 is a computing system includes a means for receiving a geographic area indication that corresponds to a geographic area of a plurality of different geographic areas, and provisioning information indicative of a set of tasks to be performed on each computing host in the geographic area; a means for dynamically generating, based on the geographic area indication, a computing host list that identifies a set of computing hosts in the geographic area; and a means for sending, to a provisioning node of a plurality of provisioning nodes, instructions to implement the set of tasks on the set of computing hosts identified in the computing host list, the provisioning node being associated with the geographic area.

Example 2 is the computing system of example 1 further comprising a means for determining the provisioning node based on the geographic area indication.

Example 3 is a computing system that includes a geographic area indication receiver to receive a geographic area indication that corresponds to a geographic area of a plurality of different geographic areas, and provisioning information indicative of a set of tasks to be performed on each computing host in the geographic area; a computing host list generator to dynamically generate, based on the geographic area indication, a computing host list that identifies a set of computing hosts in the geographic area; and a provisioning node instructor to send, to a provisioning node of a plurality of provisioning nodes, instructions to implement the set of tasks on the set of computing hosts identified in the computing host list, the provisioning node being associated with the geographic area.

Example 4 is a method comprising: accessing, by a computing system, information that includes a first computing host list that identifies a set of computing hosts and provisioning information indicative of a set of tasks to be performed on each computing host in the set of computing hosts, wherein each computing host in the set of computing hosts is associated with a particular geographic area of a plurality of geographic areas; determining, by the computing system, a set of geographic areas that comprises each geographic area of the plurality of geographic areas with which at least one computing host in the set of computing hosts is associated; based on the set geographic areas, determining, by the computing system, a set of provisioning nodes from a plurality of provisioning nodes, the set of provisioning nodes comprising those provisioning nodes of the plurality of provisioning nodes associated with the geographic areas identified in the set of geographic areas; and sending, by the computing system to each respective provisioning node in the set of provisioning nodes, instructions to implement the set of tasks on a group of computing hosts associated with the geographic area with which the respective provisioning node is associated.

Example 5 is the method of example 4 wherein determining the set of geographic areas that comprises each geographic area with which at least one computing host in the set of computing hosts is associated further comprises: accessing, by the computing system, computing host metadata associated with each respective computing host in the set of computing hosts, the computing host metadata identifying for each respective computing host a particular geographic area of a plurality of different geographic areas with which the respective computing host is associated.

Example 6 is the method of example 4 wherein determining the set of provisioning nodes from the plurality of provisioning nodes, comprises: accessing, by the computing system, a data structure that identifies the plurality of provisioning nodes, and for each provisioning node of the plurality of provisioning nodes, a corresponding geographic area.

Example 7 is the method of example 4 wherein determining the set of geographic areas that comprises each geographic area with which at least one computing host in the set of computing hosts is associated further comprises: determining, by the computing system, a set of IP addresses that comprises those IP addresses of each respective computing host in the set of computing hosts; and determining, for each IP address in the set of IP addresses, a geographic location associated with the IP address.

Example 8 is the method of example 4 wherein determining the set of geographic areas that comprises each geographic area with which at least one computing host in the set of computing hosts is associated further comprises: sending, by the computing system, a message to each respective computing host in the set of computing hosts requesting a geographic location of the computing host; and receiving, from each respective computing host, a geographic location of the respective computing host.

Example 9 is the method of example 4 further comprising: generating, by the computing system, a plurality of second computing host lists, each second computing host list corresponding to a different respective geographic area and identifying a group of computing hosts associated with the respective geographic area.

Example 10 is the method of example 9 further comprising: sending, by the computing system, each second computing host list to a provisioning node in the set of provisioning nodes associated with the geographic area corresponding to the second computing host list.

Example 11 is the method of example 9 further comprising: storing, by the computing system, each respective second computing host list in a different predetermined location associated with the provisioning node that corresponds to the respective second computing host list.

Example 12 is the method of example 9 further comprising: receiving, by a first provisioning node in the set of provisioning nodes, the instructions to implement the set of tasks on a group of computing hosts identified in a second computing host list; and implementing, by the first provisioning node on the group of computing hosts identified in the second computing host list, the set of tasks.

Example 13 is the method of example 12 wherein the group of computing hosts identified in the second computing host list is a subset of a plurality of computing hosts associated with the geographic area with which the first provisioning node is associated.

Example 14 is a computing system comprising one or more computing devices to: access information that includes a first computing host list that identifies a set of computing hosts and provisioning information indicative of a set of tasks to be performed on each computing host in the set of computing hosts, wherein each computing host in the set of computing hosts is associated with a particular geographic area of a plurality of geographic areas; determine a set of geographic areas that comprises each geographic area with which at least one computing host in the set of computing hosts is associated; based on the set geographic areas, determine a set of provisioning nodes from a plurality of provisioning nodes, the set of provisioning nodes comprising those provisioning nodes of the plurality of provisioning nodes associated with the geographic areas identified in the set of geographic areas; and send, to each respective provisioning node in the set of provisioning nodes, instructions to implement the set of tasks on a group of computing hosts associated with the geographic area with which the respective provisioning node is associated.

Example 15 is the computing system of example 14 wherein to determine the set of geographic areas that comprises each geographic area with which at least one computing host in the set of computing hosts is associated, the computing system is further to: access computing host metadata associated with each respective computing host in the set of computing hosts, the computing host metadata identifying for each respective computing host a particular geographic area of a plurality of different geographic areas with which the respective computing host is associated.

Example 16 is the computing system of example 14 wherein to determine the set of geographic areas that comprises each geographic area with which at least one computing host in the set of computing hosts is associated, the computing system is further to: determine a set of IP addresses that comprises those IP addresses of each respective computing host in the set of computing hosts; and determine, for each IP address in the set of IP addresses, a geographic location associated with the IP address.

Example 17 is a non-transitory computer-readable storage medium that includes executable instructions to cause one or more processor devices to: access information that includes a first computing host list that identifies a set of computing hosts and provisioning information indicative of a set of tasks to be performed on each computing host in the set of computing hosts, wherein each computing host in the set of computing hosts is associated with a particular geographic area of a plurality of geographic areas; determine a set of geographic areas that comprises each geographic area with which at least one computing host in the set of computing hosts is associated; based on the set geographic areas, determine a set of provisioning nodes from a plurality of provisioning nodes, the set of provisioning nodes comprising those provisioning nodes of the plurality of provisioning nodes associated with the geographic areas identified in the set of geographic areas; and send, to each respective provisioning node in the set of provisioning nodes, instructions to implement the set of tasks on a group of computing hosts associated with the geographic area with which the respective provisioning node is associated.

Individuals will recognize improvements and modifications to the preferred examples of the disclosure. All such improvements and modifications are considered within the scope of the concepts disclosed herein and the claims that follow.

What is claimed is:

1. A method comprising:

receiving, by a computing system, a first geographic area indication that corresponds to a first geographic area of a plurality of different geographic areas, and provisioning information indicative of a first set of tasks to be performed on each computing host in the first geographic area;

dynamically generating, by the computing system based on the first geographic area indication, a first computing host list that identifies a first set of computing hosts in the first geographic area, wherein dynamically generating the first computing host list comprises:

accessing computing host metadata associated with a plurality of computing hosts, the computing host metadata identifying, for each respective computing host, a particular geographic area of the plurality of different geographic areas with which the respective computing host is associated, and wherein the computing host metadata associated with a particular computing host of the plurality of computing hosts comprises credentials for provisioning the particular computing host; and sending, by the computing system to a first provisioning node of a plurality of provisioning nodes, instructions to implement the first set of tasks on the first set of computing hosts identified in the first computing host list, the first provisioning node being associated with the first geographic area.

2. The method of claim 1 further comprising determining, by the computing system, the first provisioning node based on the first geographic area indication.

3. The method of claim 2 wherein determining the first provisioning node based on the first geographic area indication comprises:

accessing a data structure that identifies the plurality of provisioning nodes and, for each provisioning node of the plurality of provisioning nodes, a corresponding geographic area; and based on the first geographic area indication and the data structure, determining that the first provisioning node is operable to provision computing hosts located in the first geographic area.

4. The method of claim 1 further comprising:

receiving, by the first provisioning node, the instructions to implement the first set of tasks on the first set of computing hosts identified in the first computing host list; and implementing, by the first provisioning node on one or more computing hosts identified in the first computing host list, the first set of tasks.

5. The method of claim 1 wherein dynamically generating the first computing host list further comprises:

adding, by the computing system to the first computing host list based on the computing host metadata, a computing host identifier for each computing host of the plurality of computing hosts that is associated with the first geographic area.

6. The method of claim 1 wherein dynamically generating the first computing host list further comprises:

determining a plurality of Internet Protocol (IP) addresses of the plurality of computing hosts, each IP address corresponding to one of the computing hosts of the plurality of computing hosts;

determining, based on each IP address of the plurality of IP addresses, a geographic location associated with the IP address; and adding, by the computing system to the first computing host list, a computing host identifier for each computing host of the plurality of computing hosts that is associated with the first geographic area and has a corresponding IP address that is associated with the first geographic area.

7. The method of claim 6 wherein determining the plurality of IP addresses of the plurality of computing hosts comprises:

sending a message to each computing host of the plurality of computing hosts requesting the geographic location of the computing host.

8. The method of claim 1 further comprising:

receiving, by the computing system, a second geographic area indication that corresponds to a second geographic area of the plurality of different geographic areas, and provisioning information indicative of a second set of tasks to be performed on each computing host in the second geographic area;

dynamically generating, by the computing system based on the second geographic area indication, a second computing host list that identifies a second set of computing hosts in the second geographic area; and sending, by the computing system to a second provisioning node of the plurality of provisioning nodes, instructions to implement the second set of tasks on the second set of computing hosts, the second provisioning node being associated with the second geographic area.

9. The method of claim 1 wherein the first set of computing hosts are mobile computing hosts.

10. A computing system comprising:

one or more computing devices to:

receive a first geographic area indication that corresponds to a first geographic area of a plurality of different geographic areas, and provisioning information indicative of a first set of tasks to be performed on each computing host in the first geographic area;

dynamically generate, based on the first geographic area indication, a first computing host list that identifies a first set of computing hosts in the first geographic area, wherein, to dynamically generate the first computing host list, the one or more computing devices are to:

access computing host metadata associated with a plurality of computing hosts, the computing host metadata identifying, for each respective computing host, a particular geographic area of the plurality of different geographic areas with which the respective computing host is associated, and wherein the computing host metadata associated with a particular computing host of the plurality of computing hosts comprises credentials for provisioning the particular computing host; and send, to a first provisioning node of a plurality of provisioning nodes, instructions to implement the first set of tasks on the first set of computing hosts identified in the first computing host list, the first provisioning node being associated with the first geographic area.

11. The computing system of claim 10 wherein the one or more computing devices are further to determine the first provisioning node based on the first geographic area indication.

12. The computing system of claim 11 wherein, to determine the first provisioning node based on the first geographic area indication, the one or more computing devices are further to:

access a data structure that identifies the plurality of provisioning nodes and, for each provisioning node of the plurality of provisioning nodes, a corresponding geographic area; and based on the first geographic area indication and the data structure, determine that the first provisioning node is operable to provision computing hosts located in the first geographic area.

13. The computing system of claim 10 further comprising the first provisioning node, and wherein the first provisioning node is to:

receive the instructions to implement the first set of tasks on the first set of computing hosts identified in the first computing host list; and implement, on one or more computing hosts identified in the first computing host list, the first set of tasks.

14. The computing system of claim 10 wherein, to dynamically generate the first computing host list, the one or more computing devices are further to:
  add, to the first computing host list based on the computing host metadata, a computing host identifier for each computing host of the plurality of computing hosts that is associated with the first geographic area.

15. The computing system of claim 10 wherein, to dynamically generate the first computing host list, the one or more computing devices are further to:
  determine a plurality of Internet Protocol (IP) addresses of the plurality of computing hosts, each IP address corresponding to one of the computing hosts of the plurality of computing hosts;
  determine, based on each IP address of the plurality of IP addresses, a geographic location associated with the IP address; and
  add, to the first computing host list, a computing host identifier for each computing host of the plurality of computing hosts that is associated with the first geographic area and has a corresponding IP address that is associated with the first geographic area.

16. The computing system of claim 15 wherein, to determine the plurality of IP addresses of the plurality of computing hosts, the one or more computing devices are further to:
  send a message to each computing host of the plurality of computing hosts requesting the geographic location of the computing host.

17. The computing system of claim 10 wherein the one or more computing devices are further to:
  receive a second geographic area indication that corresponds to a second geographic area of the plurality of different geographic areas, and provisioning information indicative of a second set of tasks to be performed on each computing host in the second geographic area;
  dynamically generate, based on the second geographic area indication, a second computing host list that identifies a second set of computing hosts in the second geographic area; and
  send, to a second provisioning node of the plurality of provisioning nodes, instructions to implement the second set of tasks on the second set of computing hosts, the second provisioning node being associated with the second geographic area.

18. A non-transitory computer-readable storage medium that includes executable instructions to cause one or more computing devices to:
  receive a first geographic area indication that corresponds to a first geographic area of a plurality of different geographic areas, and provisioning information indicative of a first set of tasks to be performed on each computing host in the first geographic area;
  dynamically generate, based on the first geographic area indication, a first computing host list that identifies a first set of computing hosts in the first geographic area, wherein, to dynamically generate the first computing host list, the one or more computing devices are to:
    access computing host metadata associated with a plurality of computing hosts, the computing host metadata identifying, for each respective computing host, a particular geographic area of the plurality of different geographic areas with which the respective computing host is associated, and wherein the computing host metadata associated with a particular computing host of the plurality of computing hosts comprises credentials for provisioning the particular computing host; and
  send, to a first provisioning node of a plurality of provisioning nodes, instructions to implement the first set of tasks on the first set of computing hosts identified in the first computing host list, the first provisioning node being associated with the first geographic area.

19. The non-transitory computer-readable storage medium of claim 18 wherein the instructions further cause the one or more computing devices to determine the first provisioning node based on the first geographic area indication.

20. The non-transitory computer-readable storage medium of claim 18 wherein, to determine the first provisioning node based on the first geographic area indication, the instructions further cause the one or more computing devices to:
  access a data structure that identifies the plurality of provisioning nodes and, for each provisioning node of the plurality of provisioning nodes, a corresponding geographic area; and
  based on the first geographic area indication and the data structure, determine that the first provisioning node is operable to provision computing hosts located in the first geographic area.

* * * * *